US008333812B2

(12) United States Patent
Fischer

(10) Patent No.: US 8,333,812 B2
(45) Date of Patent: Dec. 18, 2012

(54) METHOD AND DEVICE FOR USE OF HOLLOW SPHERES IN A COMPOSITE MATERIAL

(75) Inventor: Jonathan Fischer, Hildale, UT (US)

(73) Assignee: Forestwood Industrial, Inc., Hildale, UT (US)

(*) Notice: Subject to any disclaimer, the term of this patent is extended or adjusted under 35 U.S.C. 154(b) by 462 days.

(21) Appl. No.: 12/543,416

(22) Filed: Aug. 18, 2009

(65) Prior Publication Data

US 2010/0043282 A1    Feb. 25, 2010

Related U.S. Application Data

(60) Provisional application No. 61/089,787, filed on Aug. 18, 2008.

(51) Int. Cl.
*C10L 11/00*   (2006.01)
(52) U.S. Cl. ............ 44/535; 126/500; 431/125; 431/126
(58) Field of Classification Search ............... 44/534, 44/535, 530, 520; 431/125, 126; 126/500
See application file for complete search history.

(56) References Cited

U.S. PATENT DOCUMENTS

| | | | | |
|---|---|---|---|---|
| 4,303,061 A | * | 12/1981 | Torobin | 126/708 |
| 4,303,729 A | * | 12/1981 | Torobin | 428/327 |
| 4,303,730 A | * | 12/1981 | Torobin | 428/333 |
| 4,303,732 A | * | 12/1981 | Torobin | 428/333 |
| 4,303,736 A | * | 12/1981 | Torobin | 428/403 |
| 4,339,626 A | * | 7/1982 | Fisher et al. | 136/248 |
| 4,548,196 A | * | 10/1985 | Torobin | 126/654 |
| 4,824,622 A | | 4/1989 | Kennedy et al. | |
| 4,916,173 A | | 4/1990 | Otloski et al. | |
| 5,024,795 A | | 6/1991 | Kennedy et al. | |
| 5,033,455 A | | 7/1991 | Eiklor et al. | |
| 5,118,539 A | | 6/1992 | Sebby et al. | |
| 5,271,888 A | | 12/1993 | Sinsley | |

(Continued)

FOREIGN PATENT DOCUMENTS

GB    2 348 875    10/2000

(Continued)

OTHER PUBLICATIONS

Fullmer, Brad www.intermountain.construction.com, "Change of Perception Fly ash has come a long way in 30 years," Intermountain Contractor, May 2008, pp. 37-39.

*Primary Examiner* — Cephia D Toomer
(74) *Attorney, Agent, or Firm* — Thorpe North & Western LLP

(57) ABSTRACT

A non-combustible, synthetic fire-log is disclosed comprising a composition formed to approximate the shape of a combustible object, wherein said composition comprises a substantially non-combustible matrix and an effective amount of hollow spheres. In one embodiment, the effective amount of hollow spheres ranges from approximately 3 to 85 percent of the total composition by weight. The composition enhances the aesthetic quality of the synthetic fire-log when exposed to heat and also decreases the carbon monoxide emissions of synthetic fire-log systems.

5 Claims, 3 Drawing Sheets

U.S. PATENT DOCUMENTS

| | | | |
|---|---|---|---|
| 5,358,914 A | 10/1994 | Newkirk et al. | |
| 5,612,266 A | 3/1997 | Delvaux et al. | |
| 5,786,045 A * | 7/1998 | Gerth et al. | 428/15 |
| 5,868,804 A | 2/1999 | Williams et al. | |
| 5,988,159 A | 11/1999 | Blount | |
| 6,077,467 A | 6/2000 | Sinsley | |
| 6,197,424 B1 | 3/2001 | Morrison et al. | |
| 6,354,831 B1 * | 3/2002 | Wilk et al. | 431/328 |
| 6,709,473 B2 * | 3/2004 | Cheney et al. | 44/628 |
| 7,111,421 B2 | 9/2006 | Corry et al. | |
| 7,144,456 B2 | 12/2006 | Reddy et al. | |
| 7,223,095 B1 | 5/2007 | Corry | |
| 2005/0170167 A1 | 8/2005 | Kim et al. | |

FOREIGN PATENT DOCUMENTS

| | | |
|---|---|---|
| WO | WO 2006/005119 | 1/2006 |
| WO | WO 2007/039168 | 4/2007 |

* cited by examiner

METHOD AND DEVICE FOR USE OF HOLLOW SPHERES IN A COMPOSITE MATERIAL

CLAIM OF PRIORITY

This application claims priority to U.S. Provisional Patent Application No. 61/089,787 filed on Aug. 18, 2008 and entitled "Method and Device for Use of Hollow Spheres in a Composite Material" which is incorporated herein in its entirety.

FIELD OF THE INVENTION

The present invention relates to the field of non-combustible fireplace logs. More specifically it relates to a composition comprising a substantially non-combustible matrix and an effective amount of hollow spheres therein.

BACKGROUND OF THE INVENTION AND RELATED ART

The use of fireplaces is widespread throughout this and other countries. These uses inherently encompass many hazards and nuisances as well as many benefits. These benefits include heat and entertainment. However, due to the expense of firewood, inconveniences associated with chopping and storing ones own firewood, retrieving the firewood to refuel the fireplace, and continually cleaning ashes from the spent firewood, several alternatives have been sought to replace the log-burning fires. In an attempt to replace these fires, obtaining all of the attributes of a wood fire has been difficult in that no substitute has been able to adequately affect the proper color, size, and movement of a wood-fueled flame.

Gas has been commonly used to produce flames in a fireplace and has been used in combination with several different artificial logs to attempt creating the illusion of a real fire. See for example, U.S. Pat. No. 4,060,396 to Burton; U.S. Pat. No. 4,169,709 to Stima; and U.S. Pat. No. 4,326,854 to Tanner. These devices are combustion simulating logs typically used in conjunction with wood fires as a starter. Such starter logs produce heat and flame to burn alone for several hours but do not mimic a realistic appearance of a traditional wood-burning fire.

Other devices for simulating a wood-burning fire can be found in U.S. Pat. No. 5,000,162 to Shimek; Us. Pat. No. 5,052,370 to Karabin; and U.S. Pat. No. 5,081,981 to Beal. These devices are non-combustible gas log assemblies used in connection with gas fireplaces. Each of these types of logs suffer from their inability to mimic the appearance of a realistic burning log while providing the requisite heat to the user and improving compliance with combustion standards at the same time.

SUMMARY OF THE INVENTION

In light of the problems and deficiencies inherent in the prior art, the present invention seeks to overcome these by providing a non-combustible, synthetic fire-log for use in a gas fireplace, comprising a composition formed to approximate the shape of a combustible object. Generally speaking, in accordance with one embodiment of the present invention, a non-combustible, synthetic fire-log for use in a gas fireplace is disclosed comprising a composition formed to approximate the shape of a combustible object, wherein said composition comprises a substantially non-combustible matrix and an effective amount of hollow spheres, wherein the effective amount of hollow spheres ranges from approximately 3 to 85 percent of the total composition by weight.

In one embodiment, the present invention also resides in a substantially non-combustible, synthetic fire-log and gas fireplace assembly, comprising a housing having a bottom wall, a top wall, and at least two side walls configured to receive a substantially non-combustible, synthetic fire-log; at least one substantially non-combustible, synthetic fire-log comprising a composition of a non-combustible matrix and an effective amount of hollow spheres; and a fuel source operably connected to the housing and configured to supply fuel to the housing.

In yet another embodiment, the present invention resides in a substantially non-combustible, synthetic fire-log and gas fireplace assembly, comprising a housing having a bottom wall, a top wall, and at least two side walls configured to receive a substantially non-combustible, synthetic fire-log; at least one substantially non-combustible, synthetic fire-log comprising a non-combustible matrix and an effective amount of hollow ceramic spheres disposed on an outer surface of the substantially non-combustible, synthetic fire-log; and a fuel source operably connected to the housing and configured to supply fuel to the housing.

BRIEF DESCRIPTION OF THE DRAWINGS

The present invention will become more fully apparent from the following description and appended claims, taken in conjunction with the accompanying drawings. Understanding that these drawings merely depict exemplary embodiments of the present invention they are, therefore, not to be considered limiting of its scope. It will be readily appreciated that the components of the present invention, as generally described and illustrated in the figures herein, could be arranged and designed in a wide variety of different configurations. Nonetheless, the invention will be described and explained with additional specificity and detail through the use of the accompanying drawings in which:

FIG. 3b illustrates an additional perspective view of the gas log of FIG. 3a; and FIG. 4 illustrates a gas log assembly according to one embodiment of the present invention showing use of the fire-gas log of FIG. 3a.

DETAILED DESCRIPTION OF EXEMPLARY EMBODIMENTS

Figure 1:
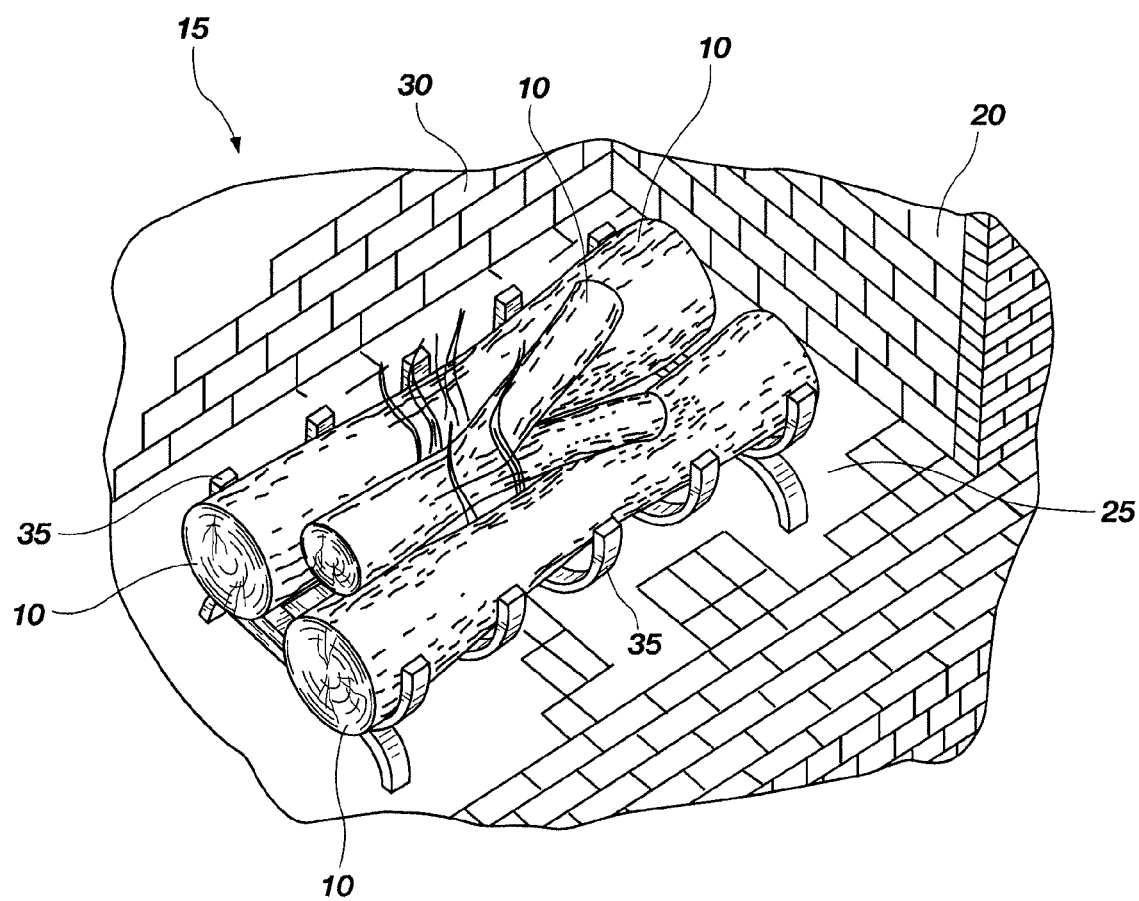
FIG. 1 illustrates a perspective view of a gas log assembly according to one embodiment of the present invention.

The following detailed description of exemplary embodiments of the invention makes reference to the accompanying drawings, which form a part hereof and in which are shown, by way of illustration, exemplary embodiments in which the invention may be practiced. While these exemplary embodiments are described in sufficient detail to enable those skilled in the art to practice the invention, it should be understood that other embodiments may be realized and that various changes to the invention may be made without departing from the spirit and scope of the present invention. Thus, the following more detailed description of the embodiments of the present invention is not intended to limit the scope of the invention, as claimed, but is presented for purposes of illustration only to describe the features and characteristics of the present invention, and to sufficiently enable one skilled in the art to practice the invention. Accordingly, the scope of the present invention is to be defined solely by the appended claims.

The following detailed description and exemplary embodiments of the invention will be best understood by reference to the accompanying drawings, wherein the elements and features of the invention are designated by numerals throughout.

The present invention provides several significant advantages over prior related input devices and the user interfaces operable with these. Many advantages will be apparent in light of the detailed description set forth below, with reference to the accompanying drawings. These advantages are not meant to be limiting in any way. Indeed, one skilled in the art will appreciate that other advantages may be realized, other than those specifically recited herein, upon practicing the present invention.

Gas logs can be made of a fire resistant ceramic and/or cement type material; however, when gas flames are directed against such materials, the gas flame is cooled by the artificial logs and many times produces a highly inefficient and dirty yellow flame. Such a flame further indicates incomplete burn of the gaseous materials due to a lack of sufficient burn temperature and oxygen supply thus creating excessive soot and carbon monoxide. The present invention fire logs are intended to be operable with gas-log fireplace systems. While specific reference is made herein to a particular configuration of a fireplace system, it is understood that any fuel source operable with a non-combustible fire log is contemplated for use herein In accordance with one embodiment of the present invention, a decorative, non-combustible, synthetic fire-log for use in a gas fireplace is disclosed comprising a composition formed to approximate the shape of a combustible object. At least one surface of the composition is molded to give the appearance and texture of another material such as, but not limited to, wood logs, coal, charcoal, rock, and/or brick. Said composition comprises a substantially non-combustible matrix and an effective amount of hollow spheres. As one of knowledge and skill in the art will appreciate, the non-combustible matrix may comprise one or more of the following: cement, sand, water, expanded shale, ceramic fibrous materials, or cinder aggregate, and pigment.

In one aspect of the invention, the hollow spheres, comprise a lightweight, inert, hollow sphere filled with a gas, typically produced as a byproduct of coal combustion at thermal power plants. Said hollow spheres are hard and rigid, light, waterproof, innoxious, and insulative. In one aspect, the hollow spheres comprise a ceramic material, such as silicon dioxide and/or aluminum oxide, or a synthetic composite material. Exemplary hollow spheres have a particle size ranging from 40 to 600 microns, a particle density ranging from 0.3-0.9 grams per cubic centimeter, and a bulk density ranging from 0.25-0.5 grams per cubic centimeter. Notably, said hollow spheres have a lower thermal mass (and subsequently a lower thermal conductivity) than the other materials comprising the substantially non-combustible matrix (e.g., cement, sand, water, expanded shale, ceramic fibrous materials, or cinder aggregate). In one aspect of the invention, the effective amount of hollow spheres added to the substantially non-combustible matrix ranges from approximately 3 to 18 percent of the total composition by weight. In yet another aspect of the invention, the effective amount of hollow spheres added to the substantially non-combustible matrix ranges from approximately 18 to 30 percent of the total composition by weight. In still another aspect of the invention, the effective amount of hollow spheres added to the substantially non-combustible matrix ranges from approximately 30 to 45 percent of the total composition by weight. In another aspect of the invention, an effective amount of hollow spheres added to the substantially non-combustible matrix ranges from approximately 45 to 85 percent by weight.

While specific ranges have been noted herein, it is important to note that different ranges of effective amounts of hollow spheres may be used as suits a particular application. The ranges of the effective amount of hollow spheres is a function of desired glow characteristics, desired reduction in carbon monoxide production, and the type of binder material utilized to bind the non-combustible matrix.

With reference now to FIG. 1, in accordance with one embodiment of the present invention, a plurality of decorative synthetic fire logs 10 are shown disposed within a fireplace 15. In this aspect of the invention, the fireplace 15 comprises an architectural element consisting of a space designed to contain a fire. The space may be defined by sidewalls 20, and a bottom floor 25. In an additional aspect, the space may be defined by a top ceiling member and/or front and back walls 30. The fireplace 15 may be used generally for heating, decoration, and/or for cooking. The space where the fire is contained is sometimes referred to as a firebox or firepit. A chimney (not shown) or other flue allows gas and particulate exhaust to escape the building. As shown, the synthetic fire logs 10 are disposed within the firepit and are supported by a frame 35 configured to support the fire logs 10 in an elevated position. In this aspect, the synthetic fire logs 10 are shown as solid members. However, as will be noted in more detail below, the synthetic fire logs 10 may comprise voids to reduce the weight and expense of the system.

Figure 2:
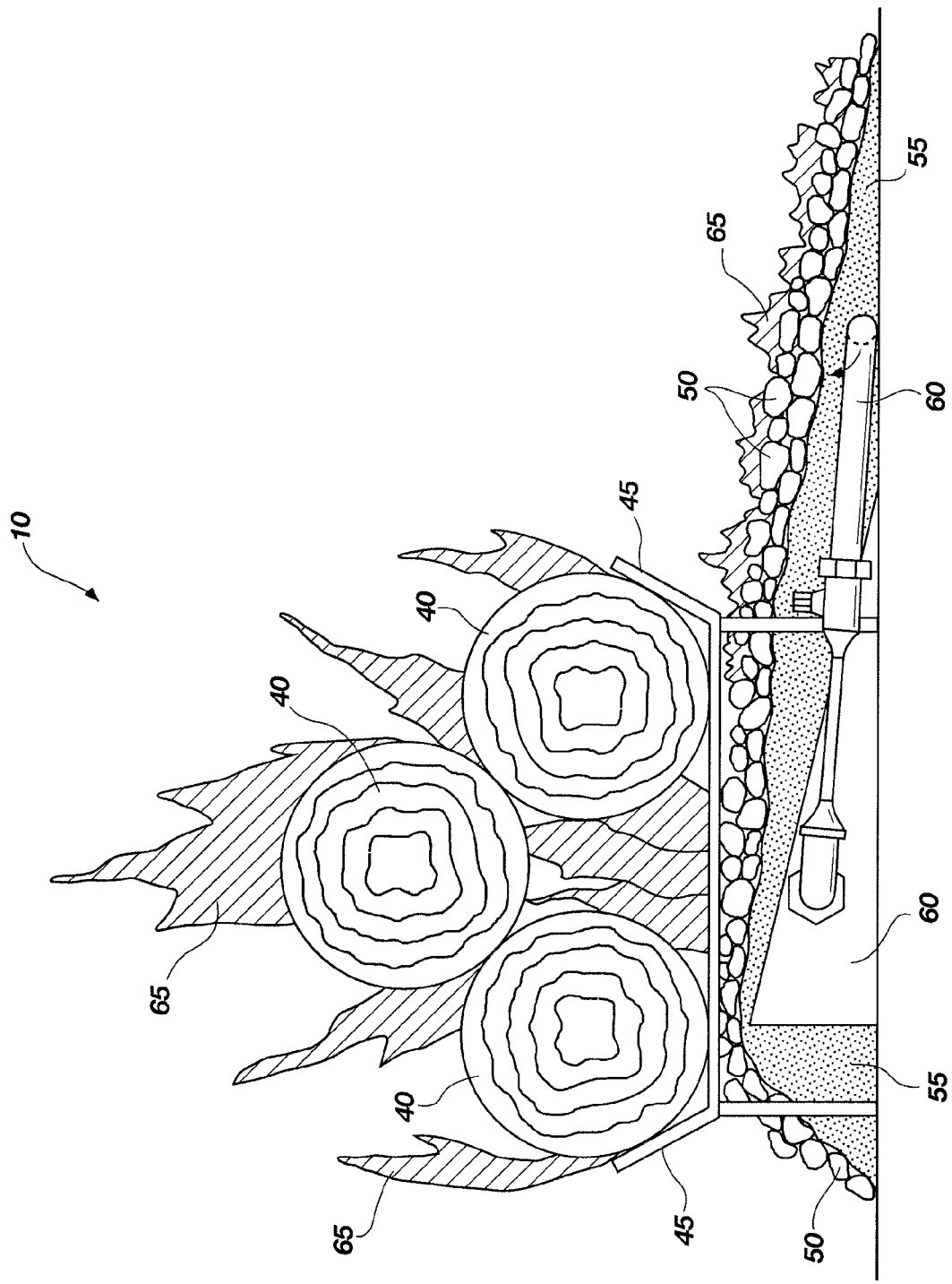
FIG. 2 illustrates a side view of a gas log assembly according to one embodiment of the present invention.

Referring now to FIG. 2, a synthetic fire log 10 assembly is illustrated comprising three synthetic logs 40 supported about a frame 45 and disposed above synthetic coal articles 50. The frame 45 and synthetic coal articles 50 are disposed above an inert material 55 such as sand which covers a gas burner assembly 60. The gas burner assembly 60 is coupled to a fuel source and is configured to provide fuel to a fireplace. Once ignited, flames 65 from the gas rise past and/or onto the fire logs 40 and coal articles 50. Hollow spheres used within the composition used to create the synthetic logs have a lower thermal mass (and subsequently a lower thermal conductivity) than the other materials comprising the substantially non-combustible matrix (i.e., cement, sand, water, expanded shale, ceramic fibers, or cinder aggregate). Advantageously, as the gas flames 65 rise past and/or onto the fire logs 40 and/or coal articles 50 the surface of the fire logs 40 and/or coal articles 50 glow as if they were actually combusting. While a glow may be otherwise induced on said synthetic materials, the presence of an effective amount of hollow spheres induces glowing of the synthetic fire logs 40 and/or coal articles 50 at a relatively lower energy input (e.g., total BTUs). That is, the presence of the spheres within the non-combustible matrix allows the surface temperature of the synthetic logs 40 and/or coal articles 50 to more quickly reach the critical necessary temperature to produce the desired glow. In one example, the non-combustible matrix allowed the surface temperature of the synthetic logs 40 and/or coal articles 50 to reach the critical necessary temperature to produce the desired glow in one minute where a regular synthetic log subjected to the same energy input did not reach the critical surface temperature for approximately 10 minutes.

As noted above, in one aspect of the invention, the effective amount of hollow spheres added to the substantially non-combustible matrix may range from approximately 3 to 85 percent of the total composition by weight, depending on a the desired glow characteristics, carbon monoxide production, and binder material utilized with the non-combustible matrix. The greater the percent of hollow spheres in the total composition, the greater the resultant glowing effect on the synthetic materials.

As noted above, in addition to the increased glowing effect on the synthetic materials, a greater percent of hollow spheres in the total composition results in fewer emissions of harmful vapors and/or smoke from the synthetic fire log assembly. As noted above, gas flames are cooled by conventional artificial logs and many times produce a highly inefficient and dirty yellow flame. Such a flame generally indicates incomplete burn of the gaseous materials due to a lack of sufficient burn temperature and oxygen supply thus creating excessive soot and carbon monoxide. It is thought that because the spheres have a lower thermal mass than the non-combustible matrix, the gas flames are cooled less by the synthetic material composition thereby increasing the combustion of the gas. As a result, the combustion process is more efficient and less soot and carbon-monoxide are produced from the fireplace assembly. In one example, the carbon monoxide emissions were reduced during the initial heating of the synthetic log significantly when compared to the initial heating of a normal synthetic log. In tests, several synthetic logs with varying percentages of hollow spheres included in the composition were subjected to a similar thermal regime (20,000 BTUs) to simulate regular heating of the synthetic logs. The relative amount of carbon-monoxide in the off-gas from the different synthetic logs is presented below:

| Percent Hollow Sphere in Composition | Carbon Monoxide (ppm) Released at Various Intervals | | | |
|---|---|---|---|---|
| | 0.5 Min | 1.0 Min | 5.0 Min | 10.0 Min |
| 0% | 37.0 | 21.0 | 10.0 | 7.0 |
| 3% | 21.0 | 16.0 | 9.5 | 7.0 |
| 7% | 15.0 | 12.5 | 9.0 | 7.0 |
| 18% | 10.5 | 9.5 | 8.0 | 7.0 |
| 30% | 10.0 | 9.0 | 8.0 | 6.5 |
| 45% | 9.5 | 8.5 | 7.5 | 6.0 |

The results presented above were conducted on synthetic fire-logs using an aggregate-based non-combustible matrix with a cement binder. It is believed that increasing the percentage of hollow spheres substantially greater than 45% of the total weight of the composition would decrease the binding efficiency of the cement in the aggregate-based non-combustible matrix. However, it is believed that a fibrous-based non-combustible matrix may be utilized which does not rely on cement as the binder. It is believed that hollow spheres may be added to such compositions at percentages ranging from approximately 45 to 85 percent of the total weight of the composition without impacting the structural stability of the cured composition. Advantageously, it is believed that such a composition would result in higher glowing properties and increased reduction in carbon monoxide production during heating of the synthetic article.

Additionally, the specific design of synthetic articles with respect to the gas flames is less restricted as the design is less limited by concerns of flame impingement on the synthetic articles. In other words, a designer is more free to create synthetic designs and fireplace assemblies wherein the flames impinge more directly on the synthetic articles without the negative impacts resulting from the cooling of the flames.

Additional advantages from use of hollow spheres in the synthetic articles include reduction in the total weight of the molded composition due to the fact that the spheres are significantly lighter than traditional aggregates. This has the significant advantage of reduced shipping costs and improved handling safety. Additionally, the spheres increase the durability of the synthetic articles by decreasing cracking due to the low-shrinking properties of the composition. That is, the end product last longer under normal operating conditions due to its resistance to change during thermal cycling.

Figure 3A:
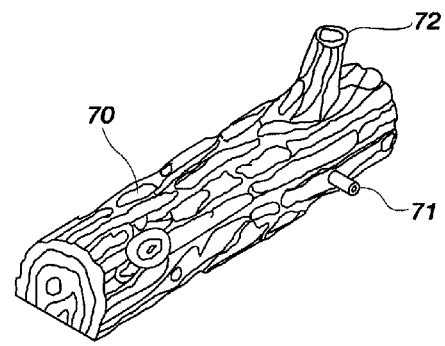
FIG. 3a illustrates a perspective view of a gas log according to one embodiment of the present invention.
Figure 3B:
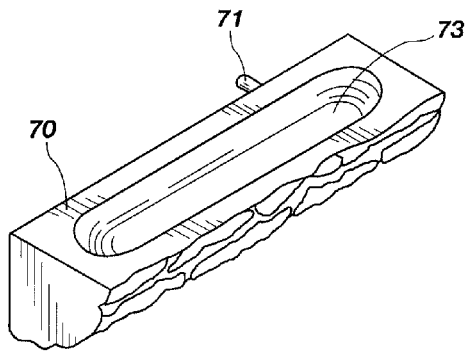
Figure 4:
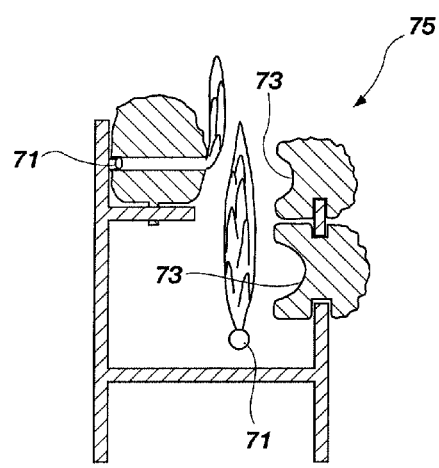

Referring to FIGS. 3a, 3b, and 4, in accordance with an additional embodiment of the present invention, a molded fire log 70 and fire log assembly 75 are illustrated. The molded synthetic fire logs 70 may comprise openings therethrough for allowing the attachment of gas pipes 71 as are commonly used in gas fireplaces. The molded fire logs 70 may also comprise a number of generally cylindrical extensions 72, and/or cylindrical openings which are used in conjunction with other synthetic articles and/or related support structures, for correctly orienting and aligning a plurality of the synthetic articles into a useful configuration. The molded synthetic articles may also have one of its surfaces, (e.g., a back or bottom surface) formed into a concave shape 73 in order to minimize the total volume of material used in forming the article.

In accordance with one embodiment of the present invention, the non-combustible matrix and effective amount of spheres may be mixed in a mixing basin (not shown) for a suitable amount of time and thereafter poured into a mold (not shown). The mold can be placed on a shaker table to be vibrated for a sufficient amount of time to allow the composition to completely fill the textured surfaces of the mold, yet not so long as to cause the spheres to settle out of the composition. In yet another aspect, where a bottom surface of the mold contains the textured features desired in the molded article, the mold is vibrated for an excessive period of time such that the spheres settle in to the textured areas. In this manner, the glowing properties of the synthetic article in a particular area are increased due to the increased amount of spheres present in that portion of the composition. The amount of vibration time required to settle the spheres into the mold will depend on the type of vibrator utilized.

Once sufficiently cured, the composition may be removed from the mold. A high-lighting material may be applied to the textured surface of the composition in order to increase its realistic appearance. Advantageously, the amount of detail that can be achieved when molding or casting ceramic fibrous articles with the disclosed technology, for example, is significantly increased. This improvement is due to the smaller particle size of the spheres in comparison to typical fiber-only mixes. This allows for a better conformation to the mold by acting as filler between and around the fibers.

In accordance with another embodiment of the present invention, hollow spheres may be adhered to an outer surface of a synthetic fire log. In one embodiment, an amount of a heat resistant mastic, such as sodium silicate, may be applied to a surface of a synthetic fire log. A number of hollow spheres may be applied to the area having the temperature resistant mastic. In this manner, the glowing properties of the ceramic spheres may be advantageously utilized without having to mix the hollow spheres with the composition for making the synthetic fire log.

In an additional aspect, an adhesive composition comprising an adhesive and an effective amount of hollow spheres may be created and thereafter applied to a surface of the synthetic fire log. The adhesive composition may be added to the synthetic fire log to add increased texturing and/or other features on the synthetic log to increase the realistic appearance of the fire log. In this manner, the density of spheres within the adhesive composition may be more closely approximated and designed for a particular application. A dye or other coloring agent may be added to the adhesive composition to further increase its realistic appearance.

In an additional embodiment, a method of simulating illumination from a combustible log is disclosed. Said method comprises the steps of obtaining a housing having a bottom wall, a top wall, and at least two side walls, said housing being configured to receive a substantially non-combustible, synthetic fire-log therein. The method further comprises obtaining at least one substantially non-combustible, synthetic fire-log article (i.e., a fire-log or piece of coal, etc.) comprising a non-combustible matrix and an effective amount of hollow spheres and heating the at least one substantially non-combustible, synthetic fire-log article to a predetermined temperature. While a specific configuration of a housing has been noted referenced, it is understood that any suitable housing is contemplated for use herein. It is also understood and contemplated herein, that no type of housing need be used. That is, the synthetic fire-log article may be used without any housing as suits a particular application.

More specifically, while illustrative exemplary embodiments of the invention have been described herein, the present invention is not limited to these embodiments, but includes any and all embodiments having modifications, omissions, combinations (e.g., of aspects across various embodiments), adaptations and/or alterations as would be appreciated by those in the art based on the foregoing detailed description. The limitations in the claims are to be interpreted broadly based on the language employed in the claims and not limited to examples described in the foregoing detailed description or during the prosecution of the application, which examples are to be construed as non-exclusive. For example, in the present disclosure, the term "preferably" is non-exclusive where it is intended to mean "preferably, but not limited to." Any steps recited in any method or process claims may be executed in any order and are not limited to the order presented in the claims. Means-plus-function or step-plus-function limitations will only be employed where for a specific claim limitation all of the following conditions are present in that limitation: a) "means for" or "step for" is expressly recited; and b) a corresponding function is expressly recited. The structure, material or acts that support the means-plus function are expressly recited in the description herein. Accordingly, the scope of the invention should be determined solely by the appended claims and their legal equivalents, rather than by the descriptions and examples given above.

What is claimed and desired to be secured by Letters Patent is:

1. A decorative, non-combustible synthetic fire-log, comprising:
   a composition formed to approximate the shape of a combustible object,
   wherein said composition comprises a substantially non-combustible matrix comprising concrete and an effective amount of hollow spheres, and
   wherein the effective amount of hollow spheres ranges from approximately 3 to 30 percent of the total composition by weight.

2. The decorative, non-combustible, synthetic fire-log of claim 1, wherein the substantially non-combustible matrix further comprises ceramic fiber articles.

3. The decorative, non-combustible, synthetic fire-log of claim 1, wherein the synthetic fire-log has a first surface and a second surface, wherein the distribution of the effective amount of hollow spheres on the first surface is different than the distribution of the effective amount of hollow spheres on the second surface.

4. The decorative, non-combustible, synthetic fire-log of claim 1, wherein the distribution of the effective amount of hollow spheres throughout the composition is variable.

5. The decorative, non-combustible, synthetic fire-log of claim 1, wherein the distribution of the effective amount of hollow spheres throughout the composition is substantially fixed.

* * * * *